(12) United States Patent
Rettig et al.

(10) Patent No.: US 6,963,944 B1
(45) Date of Patent: Nov. 8, 2005

(54) METHOD AND DEVICE FOR THE SERIAL TRANSMISSION OF DATA

(75) Inventors: Thomas Rettig, Rheda-Wiedenbruck (DE); Ralf Bellenhaus, Ennigerloh (DE); Christian Zerbermann, Beverungen (DE); Kemal Cevik, Bielefeld (DE); Karl-Friedrich Penning, Lage (DE); Ulrich Wagener, Bueckeburg (DE); Stefan Steinkämper, Detmold (DE); Holger Hähnel, Bielefeld (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 09/505,895

(22) Filed: Feb. 17, 2000

(30) Foreign Application Priority Data

Feb. 18, 1999 (DE) .......................................... 199 06 867

(51) Int. Cl.[7] .............................................. G06F 13/14
(52) U.S. Cl. ........................ 710/305; 710/110; 710/105
(58) Field of Search ................................. 710/305, 105, 710/110, 30

(56) References Cited

U.S. PATENT DOCUMENTS

| 4,740,909 | A | * | 4/1988 | Conklin et al. ................ 710/68 |
| 4,742,484 | A | * | 5/1988 | Yanai et al. .................. 709/208 |
| 4,914,574 | A | * | 4/1990 | Terada et al. ................... 710/1 |
| 4,914,625 | A | * | 4/1990 | Billian .......................... 714/2 |
| 5,119,496 | A | * | 6/1992 | Nishikawa et al. ........... 710/269 |
| 5,119,501 | A | * | 6/1992 | Perry et al. ............... 455/562.1 |
| 5,179,670 | A | * | 1/1993 | Farmwald et al. ........... 710/104 |
| 5,265,166 | A | * | 11/1993 | Madnick et al. ............. 381/27 |
| 5,321,818 | A | * | 6/1994 | Wendling et al. ............ 710/110 |
| 5,325,199 | A | * | 6/1994 | Childs ......................... 348/459 |
| 5,361,260 | A | * | 11/1994 | Mito ........................... 370/452 |
| 5,423,053 | A | * | 6/1995 | Cahen ........................ 710/107 |
| 5,488,736 | A | * | 1/1996 | Keech et al. ................. 711/114 |
| 5,574,951 | A | * | 11/1996 | Sawyer et al. ................. 710/45 |
| 5,715,475 | A | * | 2/1998 | Munson et al. ............... 710/10 |
| 5,914,957 | A | * | 6/1999 | Dean et al. .................. 370/438 |
| 5,991,831 | A | * | 11/1999 | Lee et al. ...................... 710/33 |
| 6,009,487 | A | * | 12/1999 | Davis et al. ................. 710/105 |
| 6,026,094 | A | * | 2/2000 | Blatter ........................ 370/447 |
| 6,028,675 | A | * | 2/2000 | Fields et al. ............... 358/1.14 |
| 6,240,101 | B1 | * | 5/2001 | Co et al. ..................... 370/461 |
| 6,378,018 | B1 | * | 4/2002 | Tsern et al. .................. 710/313 |
| 6,430,218 | B1 | * | 8/2002 | Mito ........................... 375/220 |

FOREIGN PATENT DOCUMENTS

| DE | C2-4242437 | 6/1995 | |
| DE | A1-19756564 | 6/1998 | |
| EP | 0355856 A1 | * 2/1990 | .......... G06F/13/24 |
| EP | 1128275 A2 | * 8/2001 | .......... G06F/15/17 |

* cited by examiner

*Primary Examiner*—Sumati Lefkowitz
(74) *Attorney, Agent, or Firm*—Birch, Stewart, Kolasch & Birch, LLP

(57) ABSTRACT

A serial transmission of data takes place on a bus (10) which has at least one forward line (8) and one return line (9) and is connected to a plurality of slaves (S1, S2, . . . ) and via whose forward line (8) successive data frames (R1, R2, . . . ) for successive slaves (S1, S2, . . . ) are transmitted. Each slave (S1, S2, . . . ) gates out, in the process, from the forward line (8) the data frame (R1, R2, . . . ) which is provided for it, and diverts said data frame (R1, R2, . . . ) directly to the return line (9) after processing. The transmission of data can therefore be carried out very quickly and with a high response speed.

21 Claims, 5 Drawing Sheets

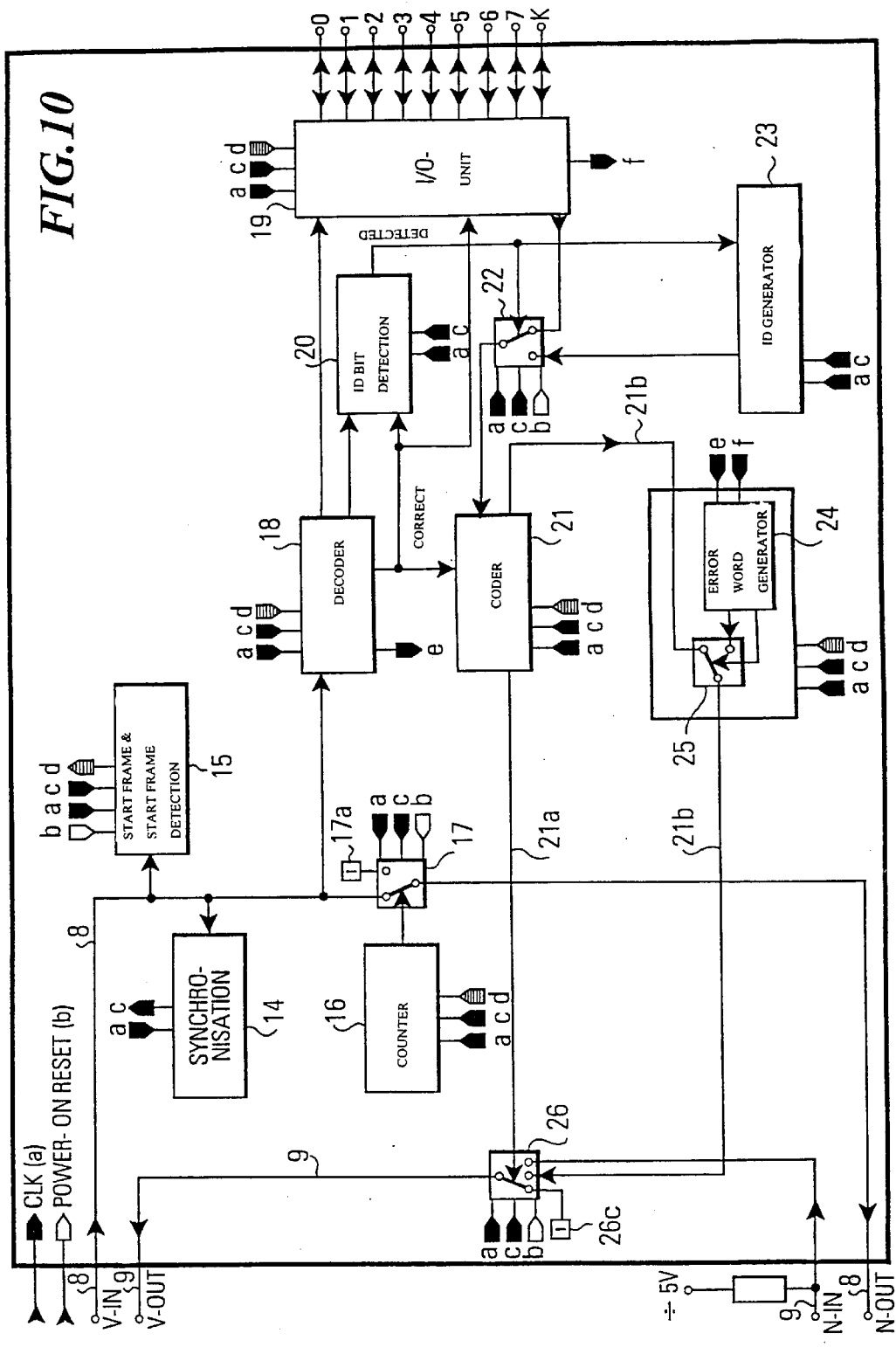

METHOD AND DEVICE FOR THE SERIAL TRANSMISSION OF DATA

The invention relates to a method and a device for the serial transmission of data according to the preambles of Patent Claims 1 and 10.

Methods and devices for the serial transmission of data are already known in the prior art.

First, FIG. 1 shows a conventional device, with line structure, which is suitable for the serial transmission of data.

Here, a plurality of slaves 2 are connected to the same line 1, the serial data being fed onto the line 1 by means of a master 3. Because all the slaves communicate on the same line, a specific address is required for each slave so that it can receive only the data which are intended for it, or in order to be able to evaluate, with reference to the address of said slave, data which it has transmitted.

A disadvantage with the line structure is that fixed addresses are required for the respective slaves. Furthermore, a bus termination is required in the case of relatively high transmission rates in the line structure.

A further conventional device for the serial transmission of data is given in FIG. 2. It is a device with a ring structure. A forward line 5 starts from a master 4 and is routed through a plurality of slaves 6, a return line 7 being laid from the last slave to the master 4. During the serial transmission of data using this device, the data which are transmitted by the master 4 are directed through each slave 6 and routed back to the master 4 from the last slave via the return line 7. In this method of data transmission, the device virtually constitutes a cyclic shift register.

A disadvantage with this device is that its reaction time is relatively long. This is due to the fact that the bus is embodied as a ring, with the result that all the data must firstly pass through all the slaves 6 before they reach the master 4 again. Moreover, the device is not consistent in terms of data sequence because the master 4 already starts the next cycle for the emission of new data before it has completely received the data from the preceding cycle.

The invention is based on the object of providing a method for the serial transmission of data in which slaves can be used without fixed addresses, and which gives rise to relatively short reaction times. In this context, it shall, at the same time, be ensured that the processed data remain consistent, that is to say there is no mixing of data from different cycles emitted by the master.

In addition, the object of the invention is to specify a device which is suitable for carrying out the method.

A method-related means of achieving the set object is specified in Claims 1. On the other hand, Claims 10 has a device-related means of achieving the set object. Advantageous refinements of the invention can be found in the respective dependent subclaims.

A method according to the invention for the serial transmission of data on a bus which has at least one forward line and one return line and is connected to a plurality of slaves and via whose forward line successive data frames for successive slaves can be transmitted is distinguished by the fact that each slave gates out from the forward line the data frame which is provided for said slave and transmits said data frame directly to the return line after processing. In this context, it is also possible for a plurality of data frames per slave to be provided, that is to say processed and diverted successively. The number of data frames provided per slave is detected by the slave on the basis of its configuration.

If therefore a telegram composed of a plurality of successive data frames is transmitted onto the forward line by the master, the data frame which is emitted first by the master arrives only at the first slave, located adjacent to the master, and is directly transmitted back to the master via said slave via the return line after processing. The first data frame therefore does not arrive at the further slaves on the bus. The second data frame of the same telegram emitted by the master passes through the first slave to the second slave, is processed by said second slave and then returned directly to the master on the return line without having to pass through the other slaves on the bus, etc. The respective data frames are thus recomposed on the return line in accordance with their originally emitted sequence and pass back to the master in precisely the same chronological sequence in which they were also emitted by said master. As a result, the data within one cycle remain consistent, specifically in terms of their sequence and in terms of the fact that they are not mixed with data of other cycles. A respective cycle is limited here by the emission of a call telegram and the reception of the response telegram by the master. Furthermore, the method gives rise to a very short response time because the respective data frames pass through only those slaves in which they are also actually processed. The response time contained in the method according to the invention is thus considerably shorter than that in the conventional system with a ring structure. If there are more data frames than slaves on the bus, the excess data frames are transmitted onto the output line of the last slave (not onto the return line) and are eliminated. For this reason, a specific bus termination, that is to say plug or a specific module, is not necessary either.

According to one refinement of the invention, it is possible to route both the forward line and the return line through the respective slaves. The data frames which are processed and diverted in the respective slaves are then transmitted back to the master on the return line which is routed through the slaves.

However, it is also possible to route only the forward line through the slaves, and to lay the return line outside the slaves, the return line then being connected to the output of a respective slave via a spur line. In the latter case, the data frames which are processed and diverted are therefore transmitted back to the master on the return line located outside the slaves.

According to one development of the invention, all the slaves are switched to reception at the same time, after which they then wait for the arrival of the data frames which are respectively provided for them. By virtue of the fact that the readiness of the slaves to receive is initiated at the same time, the reaction time of the bus 1 can be reduced further.

In this context, the slaves can be switched to reception by a start frame which is transmitted first on the forward line and which precedes the data frames. This start frame arrives at all the slaves on the bus at virtually the same time, after which the slaves are successively activated by the data frames which are respectively provided for them.

However, it is also possible for the slaves to be switched simultaneously to reception by a control signal which is applied to the return line and which is output before the data frames are transmitted. The return line in this context can either be the return line which is routed through the slaves or the return line which bypasses the slaves.

In a further refinement of the invention, each data frame contains a start bit located at the first position, and a stop bit located at the last position, with the result that asynchronous transmission of data is possible. Instead of a last stop bit, a plurality of stop bits can also be used.

According to a very advantageous development of the invention, all the data frames are structured identically here, and it is also possible for all the slaves to operate in the same way during the gating out and diversion of the data frames provided for them. All the slaves are preferably of identical design. This gives rise to a simplified operating procedure and system design.

A device according to the invention for the serial transmission of data having a bus which has at least one forward line and one return line, a plurality of slaves which are connected to the bus, a master which is connected to the bus and which transmits successive data frames for successive slaves via the forward line, and receives data frames which come from the slaves via the return line is distinguished by the fact that each slave contains the following:

- a gating-out device, connected to the forward line, for gating out from the forward line the data frame which is provided for said slave;
- a processing device for processing the gated-out data frame; and
- a diverter device, connected to the return line, for diverting directly to the return line the data frame which has been processed by the processing device.

The gating-out device also ensures that, after the reception of the start frame and of the data frame which is provided for the respective slave, this data frame does not arrive at the next slave but rather remains, and is processed, only in that slave which is provided for it. In order to process the data frame remaining in the slave, the processing device is provided which reads out data from the received data frame in order to, for example, control actuators connected to the slave, or newly writes data into the existing data frame, for example from a sensor connected to the slave. After this has taken place, the data frame which is newly filled in this way is transmitted directly to the return line by this slave, specifically by means of the diverter device which is present in the slave and which can be appropriately actuated to this effect by the processing device. Subsequently, this slave is switched again to transmission in the vicinity of the forward line, and the gating-out device is therefore deactivated again, with the result that the next data frame can then pass through this slave to the next slave. There, a corresponding processing operation is carried out on this data frame. With respect to the first slave, the first data frame received by this slave is transmitted back to the master with a delay which is somewhat longer than the length of the first data frame, with the result that, in this system, an extraordinarily short response time is obtained. Because the same processing operation takes place in all the slaves, the first data frame is followed on the return line by the next data frame at the same time intervals as was also the case when the telegram was emitted on the forward line. All the telegram data therefore remain consistent and complete.

Instead of synchronization by using a start frame, this could also take place in some other way, for example by means of specific open-circuit levels on the forward line or return line.

The gating-out device can preferably have a gating-out switch for interrupting the forward line. This gives rise to a simple design.

According to one refinement of the invention, the gating-out device can have a detection circuit for detecting a start frame which is transmitted before all the data frames, in order to move the gating-out switch into the interrupt position when the start frame is detected. In this context, the detection circuit can detect a start bit located at the start of a respective data frame and, as a function of this, increment a counter which, after the count has expired, moves the gating-out switch back into its position connecting or closing the forward line.

By means of the control by means of a start bit, and given suitable setting of the count value of the counter it is thus possible to ensure that, precisely after the processing of the data frame which is provided for the respective slave has been terminated, this slave is switched back to transmission in the vicinity of the forward line, in order then to permit the next data frame for the following slave to pass through. As a result, the reaction time of this system can be kept short even given asynchronous data processing.

All the slaves preferably have the same, or even identical design, which reduces the system costs and simplifies the processing cycle of the data frames. The diverter device used can be, for example, a multi-pole preferably three-pole change-over switch.

Exemplary embodiments of the invention are described in detail below with reference to the drawing, in which:

FIG. 10 shows a further block circuit diagram explaining the internal structure of a respective slave.

FIG. 3 shows a first exemplary embodiment of a device according to the invention for the serial transmission of data.

Figure 1:
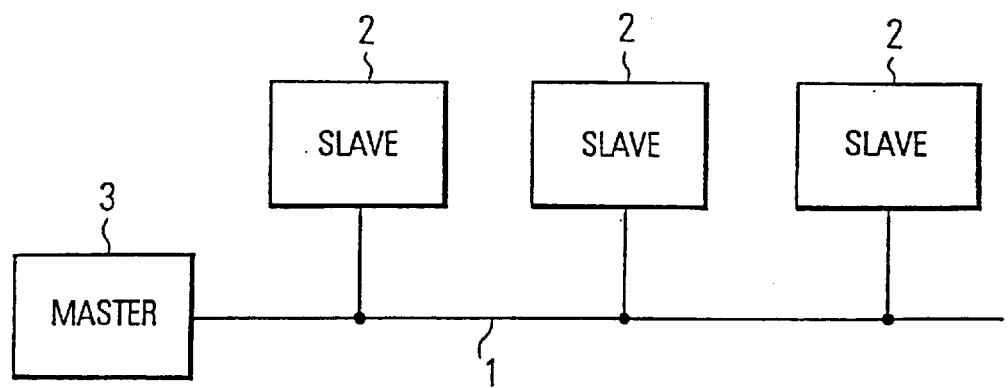
FIG. 1 shows a serial data transmission system with line structure according to the prior art.
Figure 2:
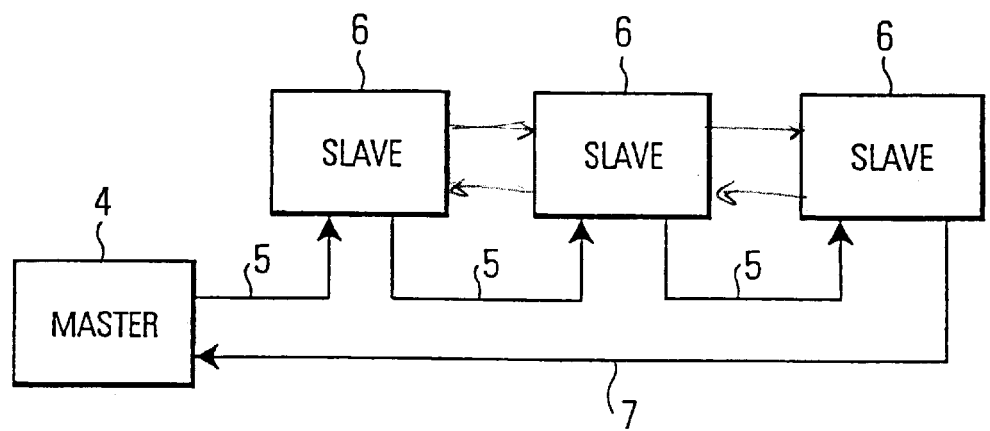
FIG. 2 shows a serial data transmission system with ring structure according to the prior art.

This device includes a master M and a plurality of slaves S1, S2, . . . , Sn. The slaves S1, S2, . . . Sn are connected to a bus 10 which comprises a forward line 8 and a return line 9 and which is itself connected to the master M. The forward line 8 and return line 9 are routed here through all the slaves S1, S2, . . . , Sn.

During operation, the master M firstly transmits a telegram onto the forward line 8, which telegram is composed of a leading start frame ST and a plurality of successive data frames R1, R2, R3, . . . . As a rule, the telegram contains as many data frames as there are slaves on the bus. In this case, the master M therefore transmits n data frames R1, R2, . . . , Rn within the telegram n onto the forward line 8.

Firstly, all the slaves S1, S2, . . . , Sn are essentially simultaneously switched to reception via the leading start frame ST, and they then wait for the data frame R1, R2, . . . , Rn provided for them. As soon as the slave S1 receives the first data frame R1 provided for it, it places its output leading to the next slave S2 at a high logic level, with the result that said output is virtually disabled. The data frame R1 is then processed in the slave S1 and, after the expiry of a time which is predefined for this, it is transmitted directly back, as data frame R'1, to the return line 9, and thus to the master M. The master M therefore receives the data frame R'1 once the previously mentioned predefined time has expired, the predefined time being somewhat longer than the length of this data frame R'1 because the latter still has to be processed in the slave, of course.

When the processing of the data frame R1 in the slave S1 is terminated, the forward line 8 is switched to transmission again in the slave S1, with the result that the data frame R2 can now pass to the slave S2. This data frame R2 is then processed in the slave S2 in the same way as the data frame R1 is processed in the slave S1, and it is then directly transmitted, as data frame R'2, onto the return line 9, in order to pass through the slave S1 to the master M. The time between the data frames R'1, R'2 on the return line 9 is virtually the same here as the corresponding time on the forward line 8. During the processing of the data frame R2 in the slave S2, its output to the next slave is also placed at an open-circuit level, for example at a high logic level, and is thus disabled. After the processing of the data frame R2 is terminated in the slave S2, its output to the next slave is then enabled again, with the result that the data frame R3 can ultimately be passed onto the subsequent slave S3 via the slave S2. At this time, the forward line 8 is not interrupted in the vicinity of the slave S1.

The procedure is repeated until the last data frame Rn has reached the last slave Sn and has been processed there. When the last data frame R'n is transmitted from the slave Sn to the master M via the preceding slaves a data cycle is terminated.

Given a relatively large number of slaves, it is possible, due to the line length, for the clock to be refreshed or the data frames to be refreshed from slave to slave.

All the data frames R1, R2, . . . Rn are structured identically and have the same length. Consequently, all the slaves also operate in an identical way. The start frame ST is the only frame which is not transmitted back to the master.

Figure 3:
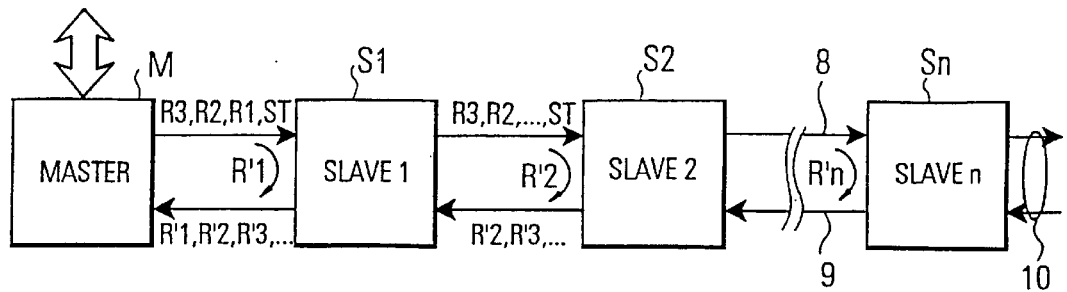
FIG. 3 shows a serial data transmission system according to a first exemplary embodiment of the present invention.
Figure 4:
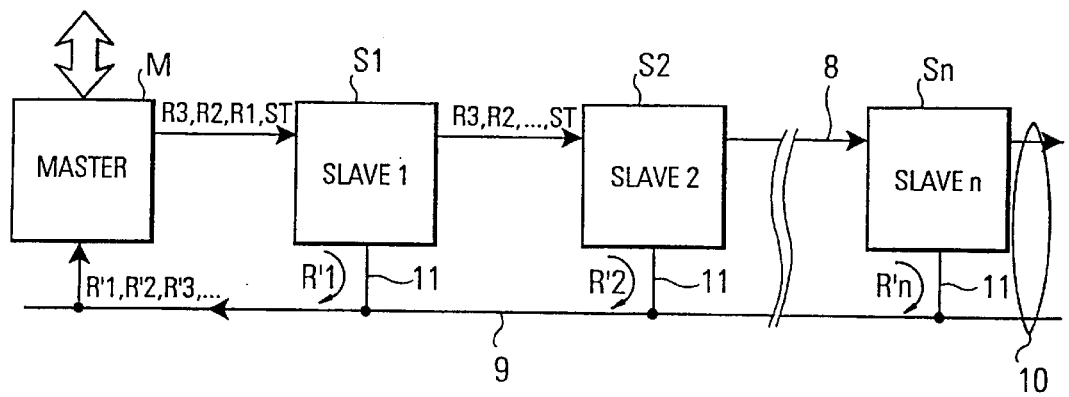
FIG. 4 shows a serial data transmission system according to a second exemplary embodiment of the present invention.

FIG. 4 shows a second exemplary embodiment of a device according to the invention. In contrast to the exemplary embodiment according to FIG. 3, the return line 9 is not routed through the respective slaves now but rather bypasses them. Here, the return line 9 is connected to the slaves merely by means of spur lines 11. Furthermore, in the exemplary embodiment according to FIG. 4, the slaves can also be synchronized by means of this return line 9. A specific start frame is not then transmitted for this, but instead the slaves are synchronized, or switched to reception, on the return line by means of a signal which is placed at a high or low logic level for a predefined time. Afterwards, each slave in turn waits for the data frame which is provided for it.

Figure 5:
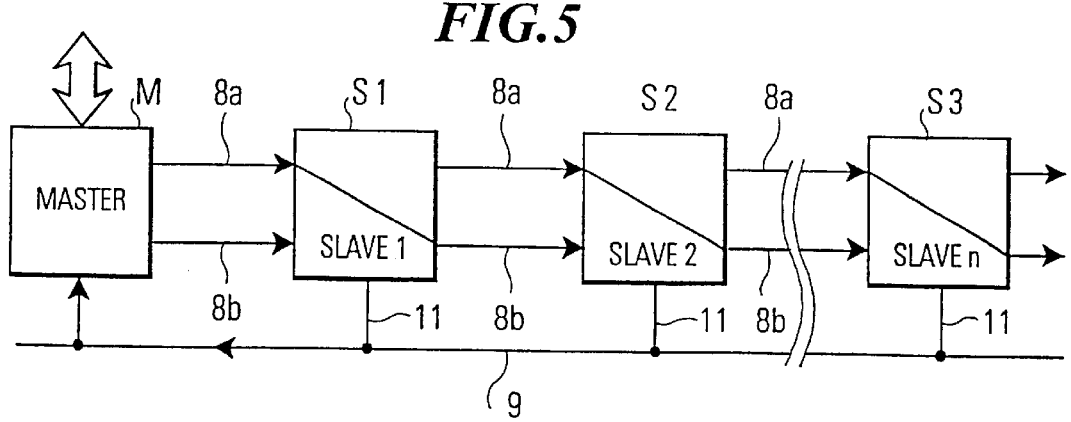
FIG. 5 shows a serial data transmission system according to a third exemplary embodiment of the present invention.

The third exemplary embodiment according to FIG. 5 corresponds to the second exemplary embodiment according to FIG. 4, but there are now two forward lines 8a and 8b provided, the master M having two outputs, and each of the slaves S1, S2, . . . , Sn having two inputs and outputs provided for the forward lines 8a, 8b. In the vicinity of the respective plug-in module locations for the slaves, the forward line 8a which is located upstream, in the direction of the transmission of data, of a plug-in module location is connected to the forward line 8b which is located downstream of the plug-in module location, while, on the other hand, the respective slaves have, at their inputs, a testing device with which it can be determined at which of the inputs data are received. If all the plug-in module locations are occupied, only those inputs of the respective slaves which are connected to the forward line 8a are switched to reception. However, if a slave does not receive any data via this input, but instead receives data at its other input which is connected to the forward line 8b, it can infer from this that a slave located upstream of it has been removed, that is to say is no longer present on the bus. In this case, the slave which detects this state supplies an error signal to the master via the return line 9. If the slave does not receive data either on its input which is connected to the forward line 8a or on its input which is connected to the forward line 8b, it can infer from this that more than one slave has been removed, so that it can transmit an appropriate error signal to the master.

Figure 6:
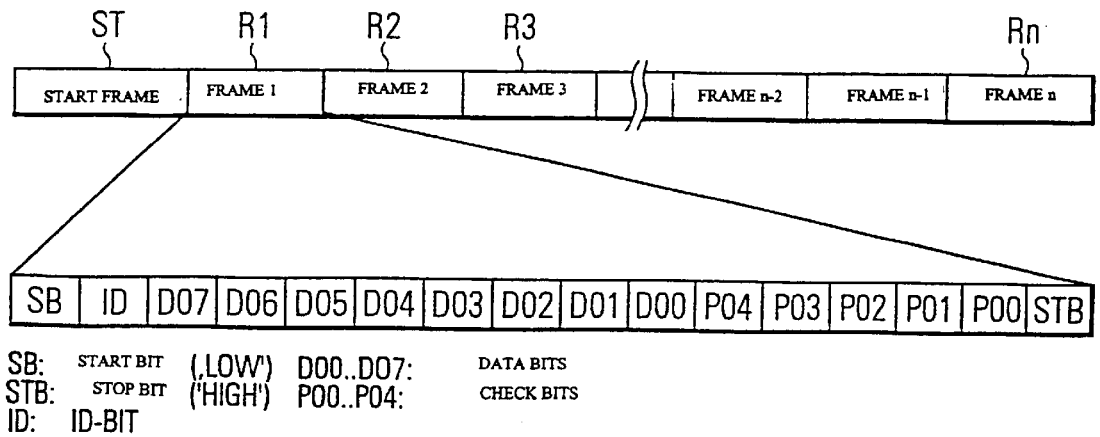
FIG. 6 shows a telegram which is used in the invention and is composed of a preceding start frame and a plurality of subsequent data frames.
Figure 7:
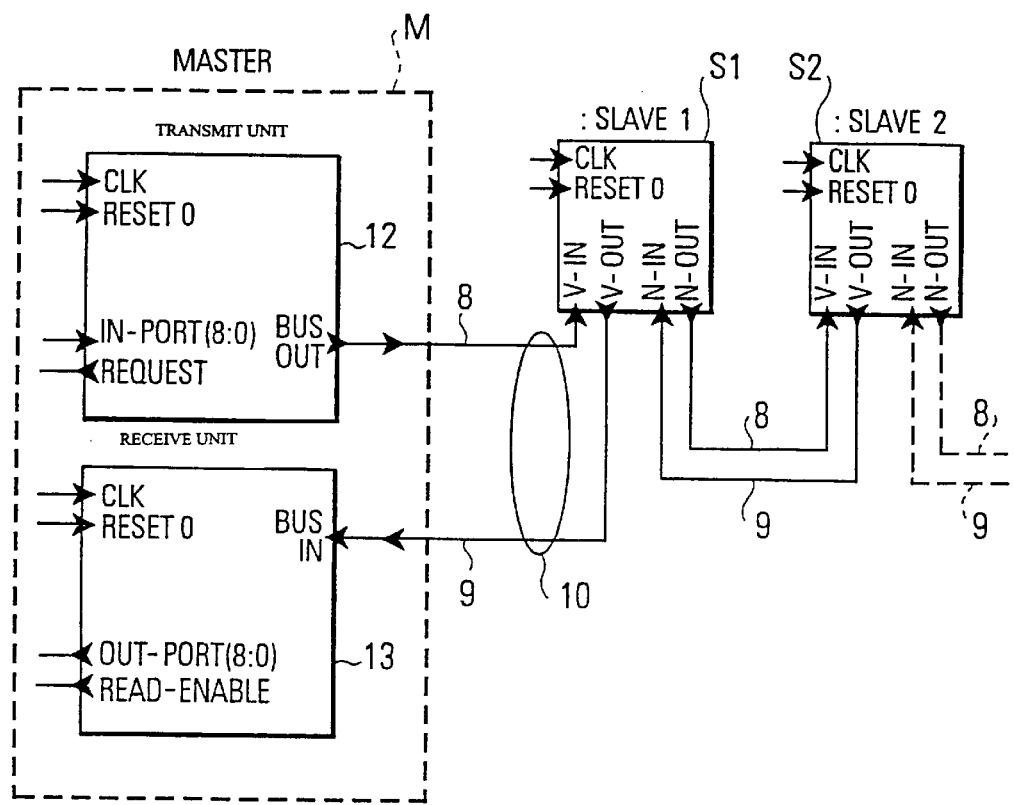
FIG. 7 shows a detailed block circuit diagram of the first exemplary embodiment of the present invention.

A telegram which is emitted by the master during the method according to the invention will be described below in more detail with reference to FIG. 6. This telegram is composed of a start frame ST and a plurality of directly successive data frames R1, R2 . . . , Rn. In order to permit the slaves to have a uniform design, a fixed frame length of at least the data frames is used. Digital I-O modules can contain, for example, eight information bits, with a result that the respective frames have eight information bits D00, D01, . . . , D07. The redundancy is thus kept as low as possible and the data processing speed is increased. In addition, an ID bit, which permits control words and error messages to be distinguished from a data frame, is provided in each frame. Because, in addition, there may be separate clock sources at the transmitter and receiver, the data are transmitted asynchronously with the start bit SB and the stop bit StB. The eight information bits and the ID bit have to be protected with 5 bits, so that transmission with Hamming distance 4 per data frame is ensured. This results in a data frame length of 16 bits, which is respectively made up of a start bit SB and a control bit StB, and an ID bit, 8 data bits D00, . . . , D007 and five check bits P00, . . . , P04.

In order to indicate the start of a new telegram, a reserved data word must be transmitted at the first place in said telegram. This is the start frame ST. This specific frame has a bit sequence which occurs only once in the telegram and can thus be identified unambiguously. Each of the slaves has a start frame identifier by means of which the slave is prepared for the start of the transmission of the frames. The last slave transmits the start frame ST to the open successor line. The start frame ST is thus the only frame which does not return to the master. As a result, a gap is produced between successive telegrams, which gap can be used by the pattern to, for example, convert the data for the field bus or other calculations of units connected upstream.

The design and method of operation of the device according to the invention in accordance with the first two exemplary embodiments will be explained in more detail below with reference to FIGS. 7 to 10, the telegram format according to FIG. 6 being used.

The master M has the function of establishing communication with the slaves. For this purpose, it must, firstly, package the data which are to be transmitted into data frames and, secondly, it must evaluate the received serial data stream and extract the appropriate useful bits. In the present case according to FIG. 7, the master M is composed of two units, namely of a transmit unit 12 and of a receive unit 13. Via an output BUSOUT of the transmit unit 12, a data telegram according to FIG. 6 is transmitted onto the forward line 8 of the bus 10, said forward line 8 being connected to a forward line input V-IN of the slave S1. Its forward line output N-OUT is connected via a further section of the forward line 8 to a forward line input V-IN of the next slave S2, and so on.

In contrast, an input BUSIN of the receive unit 13 is connected via the return line 9 of the bus 10 to a return line output V-OUT of the first slave S1 whose return line input N-IN is connected via a further section of the return line 9 to a return line output V-OUT of the next slave S2, and so on.

Figure 8:
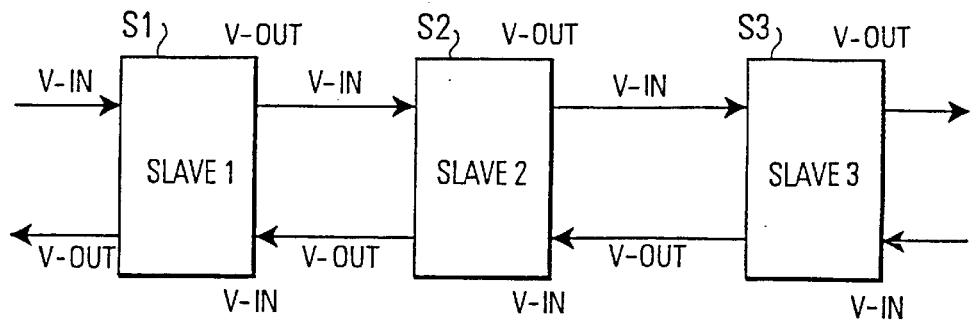
FIG. 8 shows an enlarged illustration of the block circuit diagram according to FIG. 7 in the vicinity of the slaves.

FIG. 8 shows the line connections in the vicinity of the slaves in a clearer form, and here there should only be three slaves S1, S2 and S3. Accordingly, the transmit unit 12 in FIG. 7 also transmits just one data telegram composed of a start frame and three successive data frames R1, R2 and R3, as can be seen in the last line of FIG. 9. It should be noted that this is just an example. If there are more than three slaves on the bus 10, the telegram contains correspondingly more data frames.

Figure 9:
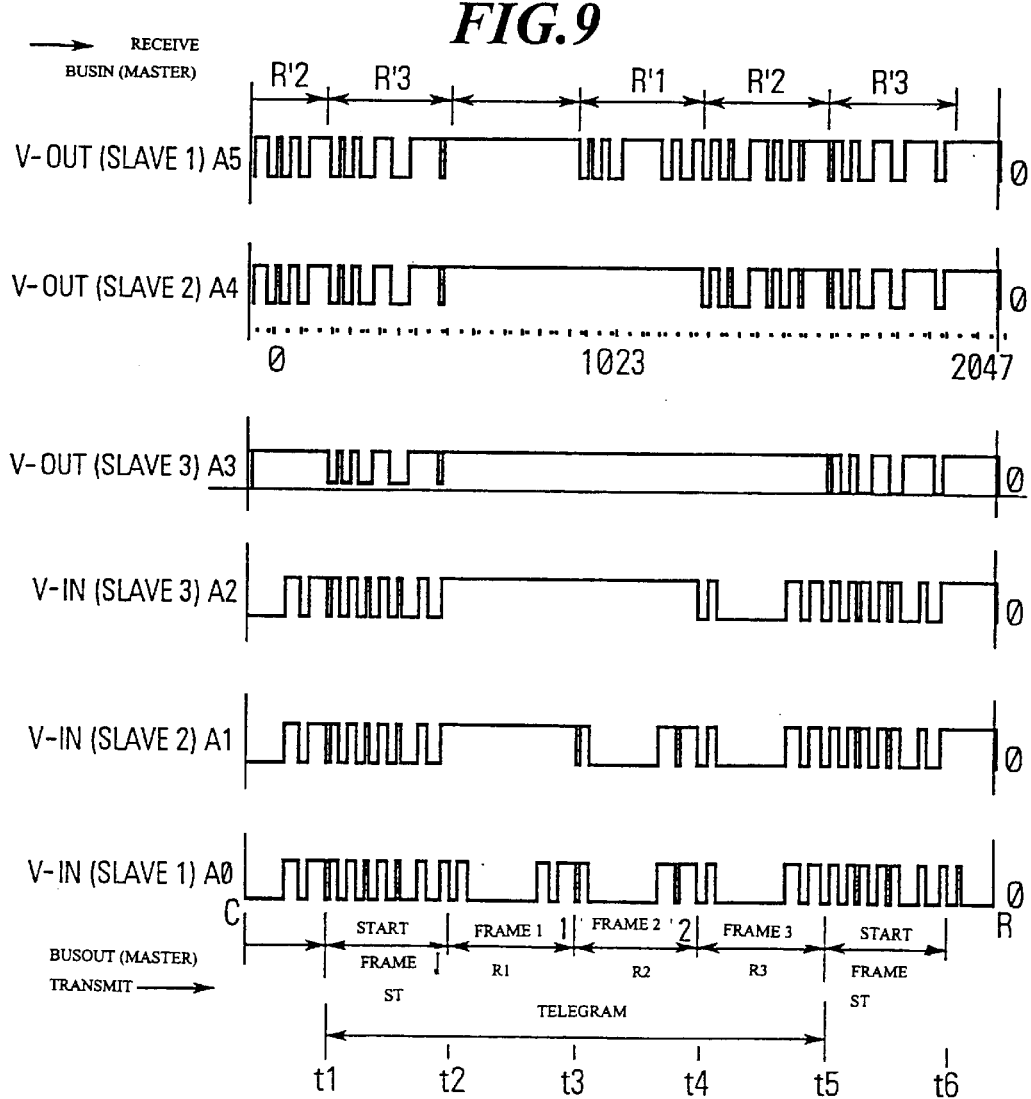
FIG. 9 shows signal diagrams for the block circuit diagrams according to FIGS. 7 and 8 for the situation in which three slaves are present and a telegram is composed of a start frame and three data frames.

FIG. 9 shows the signals at the respective inputs and outputs of the master M and of the slaves for the situation in which three slaves S1, S2 and S3 are connected to the bus 10. The telegram which is emitted by the transmit unit 12 via the output BUSOUT can be seen in the last line in FIG. 9. It contains here a 16-bit-long start frame ST and, each indirect successive, three respectively 16-bit-long data frames R1, R2 and R3 whose structure corresponds to the structure in FIG. 6.

It is clear from the first line in FIG. 9 that the receive unit 13 of the master M receives the first data frame R1 again at its input BUSIN after only approximately 32 bits. This received data frame R'1 is followed directly by the further data frames R'2 and R'3, with the result that, firstly, the response time of the system is relatively short and, secondly, its consistency is maintained.

The signal diagram in FIG. 9 also shows that the start frame which is emitted by the output BUSOUT reaches all the slaves S1, S2 and S3 simultaneously, specifically at their respective forward line inputs V-IN. All the slaves are switched to reception after the detection of this start frame ST. This takes place at the time t2.

In the directly following time period t2→t3 in which the first frame R1 is transmitted to the slave S1, the outputs of the slaves S1, S2 and S3 are at a fixed logic level, with the result that the inputs V-IN of the slaves 2 and 3 are also at a fixed logic level, as is shown. This means that the data frame R1 is gated out of the forward line 8, and is now processed in the slave S1. As long as the reception of the data frame R1 in the slave S1 lasts during the time period t2→t3, the output V-OUT of the slave S1 remains at a fixed logic level. This also applies to the other outputs V-OUT of the slaves S2 and S3.

As indicated in the time period t3→t4, the second data frame R2 now passes to the input V-IN of the slave 1 and simultaneously to the input V-IN of the slave 2, while the processed data frame R'1 is simultaneously transmitted back from the slave S1 to the master M via the output V-OUT of said slave S1. The input V-IN of the slave S3 and the output V-OUT of the slave 2 remain at a fixed logic level, with the result that the slave S2 does not yet output anything to the master M.

In the time period t4→t5, the third data frame R3 finally passes to the input V-IN of the slave S3 via the inputs V-IN of the slaves S1 and S2, as is shown in the lower part of FIG. 9. During this time, the slave S2 supplies, via its output V-OUT, the data frame R'2 to the master M, specifically via the slave S1. At this time, nothing has yet been supplied by the output V-OUT of the slave S3 because it still remains at a fixed logic level.

During the time period t5→t6, the output V-OUT of the slave 3 is then also switched through, with the result that the processed data frame R'3 is sent via it to the master M via the slaves S2 and S1. During this time period t5→t6, the new start frame S2 of the next telegram has already been output by the master M.

The design of a respective slave will now be explained in more detail below with reference to the block diagram illustrated in FIG. 10. The forward line input V-IN, the forward line output N-OUT, the return line input N-IN and the return line output V-OUT can be seen. The most important switching units contained in the respective slave are a synchronization device 14, a device 15 for detecting start frames and start bits, a counter 16, a change-over switch 17 which can be actuated by the counter, a decoder 18, an I/O unit 19, an ID bit detector device 20, a coder 21, a change-over switch 22, an ID generator 23, an error-word generator 24, and a change-over switch 25 which can be actuated by the latter. Furthermore, the coder 21 can actuate a diverter device 26 which is implemented here in the form of a three-pole change-over switch. The I/O unit 19 is also equipped, for example, with eight contacts 0 to 7 and an additional contact K via which a connection can be established to an actuator or to a sensor. The slaves can, however, also have more than eight inputs or outputs. They must then correspondingly receive a large number of data frames.

The method of operation of a respective slave will now be described in detail, specifically with reference to the telegram illustrated in FIG. 6.

It will be assumed in this respect that the forward line input V-IN and the forward line output N-OUT are connected to one another at a specific time at each slave by means of a switch contact of the change-over switch 17. The switch 17 is then in the position shown in FIG. 10. If the start frame ST is then fed onto the forward line 8 via the output BUSOUT of the transmitter unit 12 of the master M, said start frame ST passes, during the time period t1→t2 in FIG. 9, to the device 15 of the first slave S1 for detecting start frames and start bits and also onwards via the switch 17 of the first slave to the devices 15 of all the further slaves for detecting start frames and start bits.

The devices 15 for detecting start frames and start bits will then, after the start frame ST has been detected, switch over the change-over switches 17 present in the respective slaves, in such a way that a signal with a fixed logic level appears on the respective forward line outputs N-OUT. In other words, the common switch contact of the change-over switch 17 which is connected to the forward line output N-OUT is connected in each slave to a voltage source 17a which outputs a signal at a fixed logic level. FIG. 9 shows that in the time period t2→t3 all the outputs V-OUT of the slaves S1, S2 and S3 are at a fixed logic level. However, this also means that the inputs V-IN of the slaves S2 and S3 are at a fixed logic level during this time period t2→t3.

If the slave illustrated in FIG. 10 is the first slave S1, said slave also receives the first data frame R1 in the time period t2→t3.

The device 15 for detecting start frames and start bits now responds immediately to the start bit SB located in the first position in the data frame R1, and increments the counter 16. This takes place in such a way that the counter 16 disconnects the contact of the switch 17 from the voltage source 17a after a further 16 bits, and connect it again to the input V-IN of this slave. As long as the counter 16 has, however, not yet decremented the 16 bits, the contacts V-IN and N-OUT of this slave remain disconnected from one another. During this time t2→t3, the data frame R1 for the slave S1 is therefore gated out from the bus and decoded in the decoder 18. The start bit SD is not transmitted to the decoder 18, with the result that the latter first receives and identifies the ID bit and then shifts the next eight useful bits D07, D06, . . . , D00 to the I/O unit 19 in which they remain stored until the enabled operation is performed by the decoder. After a further five bits, the decoder 18 has determined whether the received data frame was correct. If there is an actuator connected to the I/O unit 19, the useful bits can then be output from said I/O unit to said actuator, or if there is a sensor connected to said I/O unit the useful bits can be input into it. The end t3 of the first frame period t2→t3 is thus reached. During this time period t2→t3, the return line output V-OUT of all the slaves was connected via the respective change-over switch 26 to a voltage source 26a which was at a fixed logic level. In other words, there was no connection between the return line input N-IN and the return line output V-OUT.

If 16 bits have passed since the detection of the start bit SB of the first data frame R1, the counter 16 firstly positions the change-over switch 17 in such a way that it connects the forward line input V-IN and forward line output N-OUT to one another again. However, this takes place only in the first slave S1, because the corresponding counters 16 have not been incremented in the other slaves. The frame period t3→t4 in FIG. 9 starts in this way. Firstly, the second data frame R2 can now be transmitted to the second slave S2 via the switch 17 of the first slave S1, so that the device 15 for detecting start frames and start bits can detect the start bit SB of the second data frame R2 in the second slave S2. However, at the same time the coding procedure is running during the time period t3→t4 in the slave S1. At the start of the time period t3→t4, the coder 21 is enabled, said coder 21 either encoding the information from the I/O unit 19 or the identification obtained from the ID generator 23. For this purpose, the coder 21, I/O unit 19 and the ID generator 23 are connected to one another by means of a two-pole change-over switch 22. In the case of an actuator which is connected to the I/O unit 19, the previously received data are thus encoded, and in the case of a sensor connected to the I/O unit 19 the data which are input are coded. The coder 21 switches over the change-over switch 26 here as soon as the coder 21 starts to write out the encoded data, with the result that the data frame R1 containing the encoded data passes back to the master M via the change-over switch 26 and the return line output V-OUT of the slave S1. After the return transmission of the data frame R1 by the coder 21 has been terminated or after the time period t3→t4 has expired, the change-over switch 26 is moved into its third switch position in which the return line input N-IN of the first slave S1 is now connected to its return line output V-OUT.

During the time period t3→t4, the same procedures are performed in the second slave S2 on the incoming data frame R2 as have occurred in the first slave S1 during the time period t2→t3 during the processing of the incoming data frame R1. Therefore, there is, in turn, gating-out of the second data frame R2 from the bus and subsequent transmission back to the master during the time period t4→t5.

The same is repeated for the third data frame R3 in the slave S3 during the time periods t4→t5 and t5→t6.

The gating-out of the respective data frames R1, R2 and R3 from the bus is therefore carried out using the change-over switches 17 which are controlled by the counter 16 and which, from slave to slave, respectively disconnect the forward line output N-OUT from the forward line input V-IN of the respective slave, for the length of the respective data frame. The gating-out device in the sense of the invention thus includes the switching units 15, 16 and 17, while the diverter device includes the three-pole change-over switch 26.

Of course, synchronization must be running during the entire operation of the system. Each rising and trailing signal edge is however detected on the V-IN line 8. A SYNC signal is generated two internal clock pulses later. If there is no change of signal edge, the SYNC signal is generated after four internal clock pulses. This signal is used, together with the internal clock, for synchronizing the slave, which means that all the access operations to the bus signal can be carried out only if the SYNC signal is present. Each switching unit in the block circuit diagram according to FIG. 10 receives the synchronization signal SYNC which is designated by the letter c and is output by the synchronization device 14, which itself receives the clock signal a or clk from the outside. If If an error is detected during decoding or a short-circuit in the actuator is detected in the I/O device 19, the error-word generator 24 switches the return line V-OUT over. The encoded information is then not transmitted back to the master, but instead an error word is transmitted back.

All the slaves are identical here in terms of basic design. They differ internally only in the I/O units 19 and in the ID generator 23, depending on the type of slave.

What is claimed is:

1. A method for the serial transmission of data on a bus, which has at least one forward line and at least one return line and is connected to a plurality of slaves and via whose forward line successive data frames for successive slaves are transmitted, the method comprising:

gating out from the forward line of each slave the data frame, which is provided for each slave; and diverting the data frame directly to the return line after processing, wherein the slaves are switched to reception by a control signal which is applied to the return line and which is output before the data frames are transmitted.

2. The method according to claim 1, wherein the return line is routed through the slaves.

3. The method according to claim 1, wherein the return line is located outside of the slaves.

4. The method according to claim 1, wherein each of the plurality of slaves are switched to a reception state at the same time.

5. The method according to claim 1, wherein the plurality of slaves are switched to a reception state by a start frame, which is transmitted on the forward line and which precedes the data frames.

6. The method according to claim 1, wherein each data frame contains a start bit, which is located at a first position, and a stop bit which is located at a last position.

7. The method according to claim 1, wherein all the data frames are structured identically.

8. The method according to claim 1, wherein all of the plurality of slaves operate in the same way during the transmission of the data frames which are provided for them.

9. The method according to claim 1, wherein the at least one forward line is electrically routed through the plurality of slaves.

10. The method according to claim 1, wherein a plurality of forward lines connects the plurality of slaves.

11. The method according to claim 1, wherein each of the plurality of slaves receives a plurality of data frames.

12. The method according to claim 1, wherein the processed data frame that is diverted to the return line has a substantially equal data length as the data frame received by the slave.

13. The method according to claim 1, wherein the control signal has a predetermined length.

14. A device for the serial transmission of data, having a bus which has at least one forward line and at least one return line;

a plurality of slaves, which are connected to the bus; and a master, which is connected to the bus and which transmits a data block comprising successive data frames for the plurality of slaves, each successive data frame being assigned to each of the successive plurality of slaves, respectively, via the forward line, and receives data frames transmitted from the slaves via the return line;

wherein each successive slave comprises:

a gating-out device, which is connected to the forward line, for gating out from the forward line the data frame which is assigned to each successive slave;

a processing device for processing the gated-out data frame; and a diverter device, connected to the return line, for diverting directly to the return line the data frame which has been processed by the processing device.

15. The device according to claim 14, wherein the gating-out device has a gating-out switch for interrupting the forward line.

16. The device according to claim 15, wherein the gating-out device has a detection circuit for detecting a start frame that is transmitted before the data frames, in order to move the gating-out switch into the interrupt position when the start frame is detected.

17. The device according to claim 16, wherein the detection circuit detects a start bit located at the start of a respective data frame, and, as a function of this, increments a counter which, after the count has expired, moves the gating-out switch back into its position connecting the forward line.

18. The device according to claim 14, wherein the diverter device is embodied as a three-pole change-over switch.

19. The device according to claim 14, wherein all of the slaves have an identical design.

20. A method for the serial transmission of data on a bus, the method comprising:

transmitting from a master to a plurality of slaves a data block via a forward line provided on the bus, the forward line being routed through each of the plurality of slaves, the data block including a start frame and a plurality of data frames, each of the plurality of data frames being respectively assigned to each of the plurality of slaves;

extracting, by each slave, the data frame assigned to the respective slave; processing the extracted data frame by the slave; and transmitting the processed data frame from the slave to the master via a return line provided on the bus.

21. The method according to claim 20, wherein each of the plurality of data frames includes a start bit, a data area, and a stop bit.

* * * * *